United States Patent
Nguyen et al.

(10) Patent No.: US 9,703,578 B2
(45) Date of Patent: Jul. 11, 2017

(54) PROVIDING CLASS LOADING FOR JAVA™ APPLICATIONS

(75) Inventors: Filip Nguyen, Brno (CZ); Marek Baluch, Nove Mesto n Vahom (SK)

(73) Assignee: Red Hat, Inc., Raleigh, NC (US)

( * ) Notice: Subject to any disclaimer, the term of this patent is extended or adjusted under 35 U.S.C. 154(b) by 201 days.

(21) Appl. No.: 13/592,881

(22) Filed: Aug. 23, 2012

(65) Prior Publication Data

US 2014/0059526 A1 Feb. 27, 2014

(51) Int. Cl.
*G06F 9/44* (2006.01)
*G06F 9/54* (2006.01)
*G06F 9/445* (2006.01)

(52) U.S. Cl.
CPC .......... *G06F 9/44521* (2013.01); *G06F 9/445* (2013.01); *G06F 9/44578* (2013.01)

(58) Field of Classification Search
None
See application file for complete search history.

(56) References Cited

U.S. PATENT DOCUMENTS

| 7,398,523 B2 * | 7/2008 | Martin | G06F 9/445 717/163 |
| 2005/0188343 A1 * | 8/2005 | Houldsworth | 717/100 |

\* cited by examiner

*Primary Examiner* — Lewis A Bullock, Jr.
*Assistant Examiner* — Mark Gooray
(74) *Attorney, Agent, or Firm* — Lowenstein Sandler LLP

(57) ABSTRACT

A mechanism for providing class loading for a JAVA application is disclosed. A method of the invention includes retrieving, by a processing device, a JAVA class file. The method also includes identifying, by the processing device, a class dependency for the JAVA class file. The method also includes determining, by the processing device, a probability that the JAVA class file is to be loaded into a cache based on the identified class dependency. The method further includes loading, by the processing device, the JAVA class file into the cache based on the probability determined for the JAVA class file.

20 Claims, 3 Drawing Sheets

PROVIDING CLASS LOADING FOR JAVA™ APPLICATIONS

TECHNICAL FIELD

The embodiments of the invention relate generally to a computer system and, more specifically, relate to systems and methods for providing class loading for JAVA applications.

BACKGROUND

Class loading is a mechanism performed by class loaders in a JAVA Virtual Machine (JVM) to load JAVA classes for a JAVA application into the JVM. The JAVA class loaders are organized in a hierarchy with system class loaders being ranked higher than the custom class loaders. The system class loader loads all the necessary classes into a cache before executing an application. The custom class loader loads the classes into the cache during run-time of the application.

There are various class loading mechanisms that exist today. One such mechanism is Websphere class loading caching. Websphere class loading caching operates by initially loading large number of JAVA classes into a cache at one time and distributing the loaded JAVA classes into a class load environment to be reused for subsequent loading. However, this initial loading of the large number of the JAVA classes at one time can be time consuming. This is because a JAVA program object for each of the JAVA classes is created and source code for each of the JAVA classes are verified during the initial loading of the JAVA classes.

Another class loading mechanism is just-in-time (JIT) compilation. JIT compilation performs a dynamic translation of source code in a JAVA class to byte code, which is then cached for later use. One problem with JIT compilation is that it ignores any content in the source code that may be used to determine which JAVA classes are to be cached at a later time.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
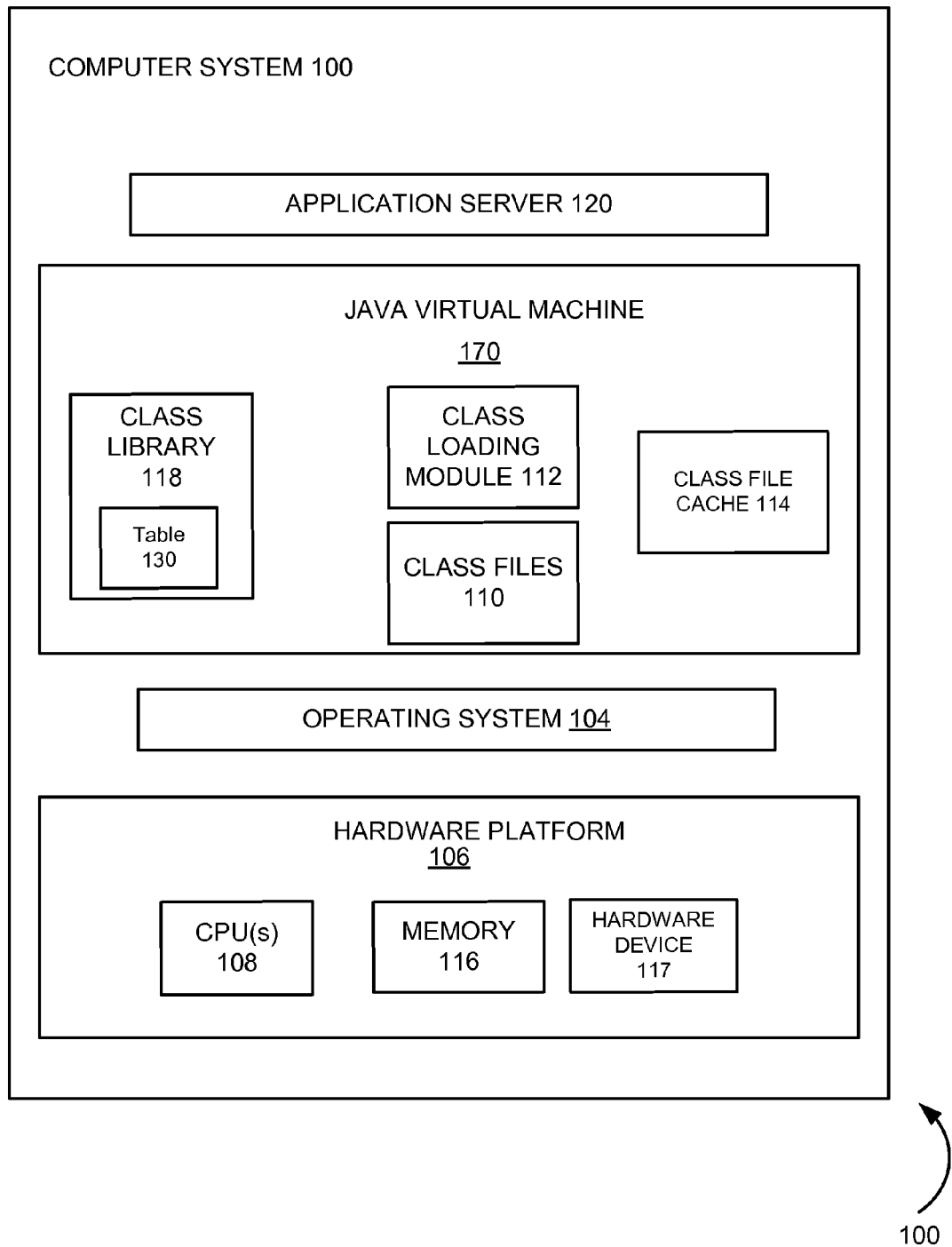
FIG. 1 is a block diagram illustrating one embodiment of an application server that supports multiple component models.

Embodiments of the invention provide for systems and methods for providing class loading for JAVA applications. A method of embodiments of the invention includes retrieving, a JAVA class file and identifying a class dependency for the JAVA class file. The method also includes determining a probability that the JAVA class file is to be loaded into a cache based on the identified class dependency. The method further includes loading the JAVA class file into the cache based on the probability determined for the JAVA class file.

In the following description, numerous details are set forth. It will be apparent, however, to one skilled in the art that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "retrieving", "identifying", "loading", "caching", "extracting", "determining", "receiving", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide systems and methods for providing class loading for JAVA applications. A class loading module is initialized on a JAVA Virtual Machine (JVM). In one embodiment, the class loading module retrieves a plurality of JAVA class files and identifies class dependencies for each of the plurality of the JAVA class files. The class loading module determines a probability that the JAVA class file is to be loaded into a cache based on the identified class dependencies. The class loading module may further load the JAVA class files into the cache based on the probability determined for the JAVA class files.

FIG. 1 is a block diagram that illustrates an embodiment of a computer system 100 that executes a JVM 170 providing an application server 120. The computer system 100 may include a server machine or a cluster of server machines. The computer system 100 may be accessed by one or more remote clients over a network (not shown), such as a private network (e.g., a local area network (LAN), wide area network (WAN), intranet, etc.) or a public network (e.g., the Internet).

The computer system 100 comprises a hardware platform 106, on top of which runs an operating system (OS) 104 that executes one or more software application programs (i.e. applications). The OS 104 may include Microsoft Windows™, Linux™, Solaris™, Mac™ OS or any other suitable operating system for managing operations on the computer system 100. In some embodiments, the hardware platform 106 may include one or more central processing units (CPUs) 108. The hardware platform 106 may also include a memory 116. In one embodiment, the memory 116 comprises one or more hardware and software devices, which may be located internally and externally to the computer system 100. Examples of memory 116 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

In addition, hardware platform 106 may include additional hardware devices 117, such as network interface cards (NICs), sound or video adaptors, photo/video cameras, printer devices, keyboards, displays or any other suitable device intended to be coupled to a computer system.

In one embodiment, the applications executed by OS 104 comprise multiple JAVA applications. In some embodiments, the multiple JAVA applications may be separate individual JAVA applications or multiple versions of the same JAVA application, or a combination of both. In one embodiment, the OS 104 executes a JVM 170 that provides the individual or multiple JAVA applications. The JVM 170 features some specifications unique to Java platform for components. These include Enterprise JavaBeans, Connectors, servlets, JavaServer Pages and several web service technologies. In some embodiments, the JVM 170 provides an application server 120.

The JVM 170 includes JAVA class files 110 and source code associated with each of the JAVA class files. In one embodiment, the JVM 170 includes a class loading module 112. The class loading module 112 is interfaced by a class load API for JAVA, which is a specification for JAVA platform application programming interfaces (APIs) to access the JAVA class files 110 in a uniform manner. In one embodiment, the class loading module 112 retrieves the JAVA class files 110 and their associated source code and installs them in a class library 118 of the JVM 170.

In one embodiment, the source code of the JAVA class files include class dependencies related to the corresponding JAVA class file. In one embodiment, the class loading module 112 identifies a number of each of different types of the class dependencies in the source code of the associated JAVA class files. The class dependencies may be identified using static code analysis. Static code analysis is an analysis of computer software that is performed without executing programs built from that software.

In one embodiment, the different types of class dependencies being identified include an imported class (IC), a reflection loaded class (RLC), and a user-guided class (UGC). The IC is a class loaded via import keyword known in JAVA programming language. The RLC is class loaded by using Class.forName method known in JAVA programming language. The UGC is a class from JAVA programming language that is identified and pre-loaded by the user. In one embodiment, the user identifies the UGC class by providing the full classified class name of the class.

The class loading module 112 determines a probability that JAVA class files are to be loaded into a cache based on the identified class dependencies. In some embodiments, the probability determined that a specific JAVA class file may be loaded during run-time. In one embodiment, the run time is run of the JAVA application using a JAVA program. In some embodiments, the probability determined for each of the JAVA class files is assigned with a value. In one embodiment, the probability is a value in the range of 0%-100%.

In some embodiments, the probability that a JAVA class file may be loaded is directly proportional to a number of occurrences of that class in the source code. In some embodiments, the probability is determined based on the number of the dependencies occurring in the JAVA class file is assigned with a value the range of 0%-100%.

In one embodiment, the probability is based on the total number of IC and RLC dependencies in the JAVA class file. For example, if the total number of IC dependencies in a JAVA class file is greater than the total number of RLC dependencies in the JAVA class file, then the probability that the JAVA class file may be loaded at run time is high. In one embodiment, the high probability is in the range of 75%-100% (out of 100%). Conversely, if the total number of IC dependencies in the JAVA class file is less than the total number of RLC dependencies in the JAVA class file, then the probability that the JAVA class file may be loaded at run time is low. In one embodiment, the low probability is in the range of 0%-25% (out of 100%). In some embodiments, if the total number of dependencies in the JAVA class file occur most frequently then, the probability of that JAVA class file to be loaded at run time may be moderate. For example, if the RLC dependencies in a JAVA class file occur in the range of 25%-75% (out of 100%) number of times compared to other dependencies, then the probability of that JAVA class file may be loaded is moderate.

In some embodiments, the probability is determined by a user for the JAVA class file having the UGC dependency. In one embodiment, the probability determined by the user is provided a value in the range of 0%-100%.

In one embodiment, the class loading module 112 stores the probability value of the corresponding JAVA class files in the class library 112. In a further embodiment, the class loading module 112 extracts the JAVA class files from the class library 118 during run time and loads them into a class file cache 114 based on the corresponding probability of the JAVA class files.

In one embodiment, the JAVA class files ranked with a high probability (in the range of 75%-100) are initially loaded first, followed by the JAVA class files ranked with a moderate probability (in the range of 25%-75%), and lastly followed by the JAVA class files ranked with a low probability (in the range of 0%-25%).

In some embodiments, if there are multiple class files that fall in the high probability range of 75%-100%, then the class file having the probability of a value closer to 100% will be loaded ahead of the class file having the probability of closer to 75%. As an example, the class file having the value of 90% will be loaded ahead of the class file having the value of 80%.

In other embodiments, if there are multiple class files that fall in the moderate probability range of 25%-75%, then the class file having the probability of a value closer to 75% will be loaded ahead of the class file having the probability of closer to 25%. As an example, the class file having the value of 60% will be loaded ahead of the class file having the value of 40%.

In other embodiments, if there are multiple class files that fall in the low probability range of 0%-25%, then the class file having the probability of a value closer to 25% will be loaded ahead of the class file having the probability of closer to 0%. As an example, the class file having the value of 20% will be loaded ahead of the class file having the value of 10%.

The host OS 104 may also include a graphical user interface (GUI) 114 configured to make the probabilities of the corresponding JAVA class files easily available to a user for search and/or other actions.

Figure 2:
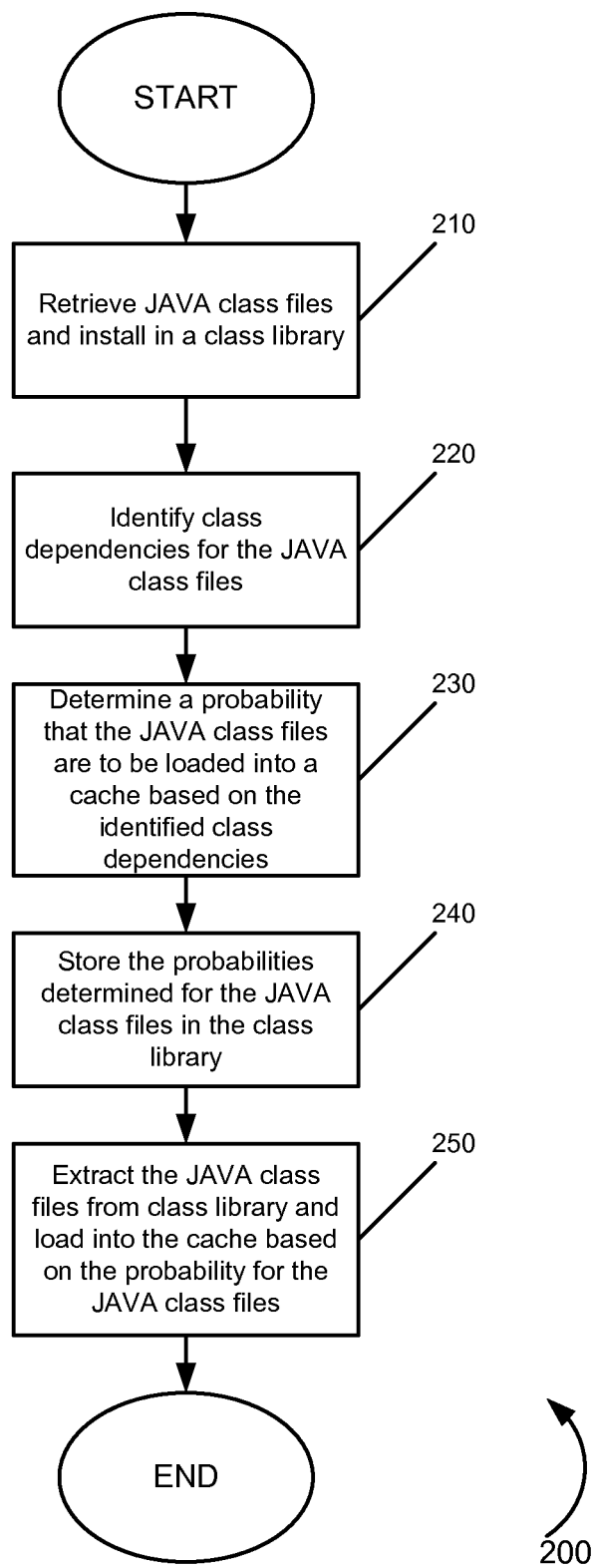
FIG. 2 is a flow diagram of one embodiment of a method for providing class loading in a JAVA application.

FIG. 2 is a flow diagram illustrating a method 200 for providing class loading for a JAVA application to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by the class loading module 112 of FIG. 1.

Method 200 begins at block 210 where JAVA class files are retrieved and installed into a class library. In one embodiment, the JAVA class files include source codes associated with the class files At block 220, class dependencies for each of the JAVA class files are identified. In one embodiment, class dependencies are determined using static code analysis of the source code associated with the JAVA class file. As discussed above, in one embodiment, the class dependencies may include an IC, RLC, and a UGC. The IC is a class loaded via import keyword known in JAVA programming language. The RLC is class loaded by using Class.forName method known in JAVA programming language. The UGC is a class from JAVA programming language that is identified and pre-loaded by the user.

At block 230, a probability that the JAVA class files are to to loaded into a cache is determined based on the identified class dependencies. In some embodiments, the probability determined that a specific JAVA class file may be loaded during run-time. In one embodiment, the run time is run of the JAVA application using a JAVA program. In some embodiments, the probability determined for each of the JAVA class files is assigned with a value. In one embodiment, the probability is a value in the range of 0%-100%.

As discussed above, in some embodiments, the probability is directly proportional to a number of occurrences of that class in the source code. In some embodiments, the probability is determined based on the number of the dependencies occurring in the JAVA class file in assigned with a value the range of 0%-100%.

In one embodiment, the probability is based on the total number of IC and RLC dependencies in the JAVA class file. For example, if the total number of IC dependencies in a JAVA class file is greater than the total number of RLC dependencies in the JAVA class file, then the probability that the JAVA class file may be loaded at run time is high. In one embodiment, the high probability is in the range of 75%-100% (out of 100%). Conversely, if the total number of IC dependencies in the JAVA class file is less than the total number of RLC dependencies in the JAVA class file, then the probability that the JAVA class file may be loaded at run time is low. In one embodiment, the low probability is in the range of 0%-25% (out of 100%). In some embodiments, if the total number of dependencies in the JAVA class file occur most frequently then, the probability of that JAVA class file to be loaded at run time may be moderate. For example, if the RLC dependencies in a JAVA class file occur in the range of 25%-75% (out of 100%) number of times compared to other dependencies, then the probability of that JAVA class file may be loaded is moderate.

As discussed above, in some embodiments, the probability is determined by a user for the JAVA class file having the UGC dependency. In one embodiment, the probability determined by the user is provided a value in the range of 0%-100%.

The probabilities determined for the JAVA class files are stored in the class library at block 240. In one embodiment, the probabilities are stored for the corresponding JAVA class file. At block 250, the JAVA class files are extracted from the class library and loaded into the cache based on the probability for the JAVA class files. In one embodiment, the JAVA class files are extracted and loaded into the cache at run time. As discussed above, in one embodiment, the run time is run of the JAVA application using a JAVA program.

As discussed above, in one embodiment, the JAVA class files ranked with a high probability (in the range of 75%-100) are initially loaded first, followed by the JAVA class files ranked with a moderate probability (in the range of 25%-75%), and lastly followed by the JAVA class files ranked with a low probability (in the range of 0%-25%).

As discussed above, in some embodiments, if there are multiple class files that fall in the high probability range of 75%-100%, then the class file having the probability of a value closer to 100% will be loaded ahead of the class file having the probability of closer to 75%. As an example, the class file having the value of 90% will be loaded ahead of the class file having the value of 80%.

As discussed above, in other embodiments, if there are multiple class files that fall in the moderate probability range of 25%-75%, then the class file having the probability of a value closer to 75% will be loaded ahead of the class file having the probability of closer to 25%. As an example, the class file having the value of 60% will be loaded ahead of the class file having the value of 40%.

As discussed above, in other embodiments, if there are multiple class files that fall in the low probability range of 0%-25%, then the class file having the probability of a value closer to 25% will be loaded ahead of the class file having the probability of closer to 0%. As an example, the class file having the value of 20% will be loaded ahead of the class file having the value of 10%.

Figure 3:
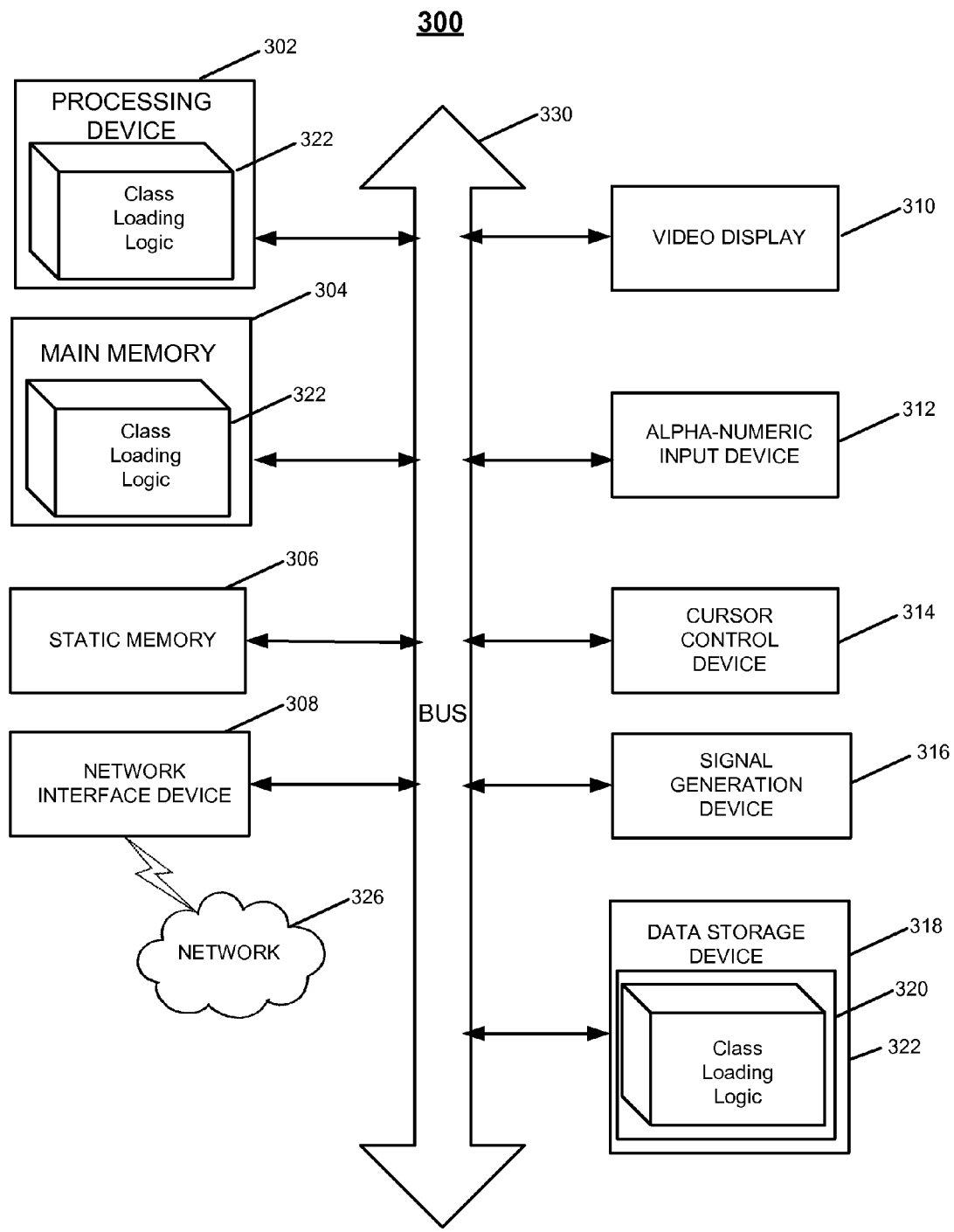
FIG. 3 illustrates a block diagram of one embodiment of a computer system.

FIG. 3 illustrates a diagrammatic representation of a machine in the exemplary form of a computer system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 300 includes a processing device 302, a memory 306 (e.g., read-only memory (ROM), flash memory, dynamic random access memory (DRAM) (such as synchronous DRAM (SDRAM) or Rambus DRAM (RDRAM), etc.), a static memory 306 (e.g., flash memory, static random access memory (SRAM), etc.), and a data storage device 318, which communicate with each other via a bus 330.

Processing device 302 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. The processing device 302 is configured to execute class loading logic 322 for performing the operations and steps discussed herein. In one embodiment, the class loading module 112 described with respect to FIG. 1 performs the class loading logic 322.

The computer system 300 may further include a network interface device 308. The computer system 300 also may include a video display unit 310 (e.g., a liquid crystal display (LCD) or a cathode ray tube (CRT)), an alphanumeric input device 312 (e.g., a keyboard), a cursor control device 313 (e.g., a mouse), and a signal generation device 316 (e.g., a speaker).

The data storage device 318 may include a machine-accessible storage medium (or more specifically a computer-readable storage medium) 320 on which is stored one or more sets of instructions (e.g. class loading logic 322) embodying any one or more of the methodologies of functions described herein, such as method 200 for providing class loading for JAVA applications as described with respect to FIG. 2. The class loading logic 322 may also reside, completely or at least partially, within the memory 303 and/or within the processing device 302 during execution thereof by the computer system 300; the memory 306 and the processing device 302 also constituting machine-accessible storage media.

The machine-readable storage medium 320 may also be used to store the class loading logic 322 persistently containing methods that call the above applications. While the machine-accessible storage medium 320 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
    retrieving a JAVA™ class file and a source code associated with the JAVA™ class file;
    identifying a plurality of different types of class dependencies in the source code of the associated JAVA™ class file;
    comparing, by a processing device, a first total number of occurrences of a first type of class dependencies among the plurality of class dependencies with a second total number of occurrences of a second type of class dependencies among the plurality of class dependencies, wherein the first type of class dependencies are different from the second type of class dependencies, wherein the first total number of the first type of class dependencies is different than the second total number of the second type of class dependencies;
    determining, by the processing device, a probability that the JAVA™ class file is to be loaded into a cache in view of the comparison; and
    loading, by the processing device, the JAVA™ class file into the cache in view of the probability determined for the JAVA™ class file.

2. The method of claim 1 further comprising storing the JAVA™ class file in a class library.

3. The method of claim 1 wherein the loading comprises extracting the JAVA™ class file from the class library and transferring the extracted JAVA class file into the cache at run time.

4. The method of claim 1 wherein the plurality of class dependencies comprise one of an imported class (IC), reflection loaded class (RLC) or a user guided class (UGC).

5. The method of claim 1 wherein the JAVA™ class file is loaded at run time.

6. The method of claim 4 wherein the probability is determined to be high when the first total number of first type of class dependencies is greater than the second total number of second type of class dependencies, wherein the first type of class dependencies comprise the IC dependencies and the second type of class dependencies comprise the RLC dependencies.

7. The method of claim 4 wherein the probability is determined to be low when the first total number of first type of class dependencies is less than the second total number of second type of class dependencies, wherein the first type of class dependencies comprise the IC dependencies and the second type of class dependencies comprise the RLC dependencies.

8. A system, comprising:
a memory;
a processing device, operatively coupled to the memory, to:
retrieve a JAVA™ class file and a source code associated with the JAVA™ class file;
identify a plurality of different types of class dependencies in the source code of the associated JAVA™ class file;
compare a first total number of occurrences of a first type of class dependencies among the plurality of class dependencies with a second total number of occurrences of a second type of class dependencies among the plurality of class dependencies, wherein the first type of class dependencies are different from the second type of class dependencies, wherein the first total number of the first type of class dependencies is different than the second total number of the second type of class dependencies;
determine a probability that the JAVA™ class file is to be loaded into a cache in view of the comparison; and
load the JAVA™ class file into the cache in view of the probability determined for the JAVA™ class file.

9. The system of claim 8, the processing device to:
store the JAVA™ class file and the associated source code in a class library.

10. The system of claim 8, the processing device to:
extract the JAVA™ class file from the class library and transfer the extracted JAVA™ class file into the cache at run time.

11. The system of claim 8 wherein the plurality of class dependencies comprise one of an imported class (IC), reflection loaded class (RLC) or a user guided class (UGC).

12. The system of claim 8 wherein the JAVA™ class file is loaded at run time.

13. The system of claim 11 wherein the probability is determined to be high when the first total number of first type of class dependencies is greater than the second total number of second type of class dependencies, wherein the first type of class dependencies comprise the IC dependencies and the second type of class dependencies comprise the RLC dependencies.

14. The system of claim 11 wherein the probability is determined to be low when the first total number of first type of class dependencies is less than the second total number of second type of class dependencies, wherein the first type of class dependencies comprise the IC dependencies and the second type of class dependencies comprise the RLC dependencies.

15. A non-transitory machine-readable storage medium including data that, when accessed by a processing device cause the processing device to:
retrieve a JAVA™ class file and a source code associated with the JAVA™ class file;
identify a plurality of different types of class dependencies in the source code of the associated JAVA™ class file;
compare, by the processing device, a first total number of occurrences of a first type of class dependencies among the plurality of class dependencies with a second total number of occurrences of a second type of class dependencies among the plurality of class dependencies, wherein the first type of class dependencies are different from the second type of class dependencies, wherein the first total number of the first type of class dependencies is different than the second total number of the second type of class dependencies;
determine, by the processing device, a probability that the JAVA™ class file is to be loaded into a cache in view of the comparison; and
load, by the processing device, the JAVA™ class file into the cache in view of the probability determined for the JAVA™ class file.

16. The non-transitory machine-readable storage medium of claim 15, the processing device further to store the JAVA™ class file a in a class library.

17. The non-transitory machine-readable storage medium of claim 15, wherein the load comprises extract the JAVA™ class file from the class library and transfer the extracted JAVA™ class file into the cache at run time.

18. The non-transitory machine-readable storage medium of claim 15 wherein the JAVA™ class file is loaded at run time.

19. The non-transitory machine-readable storage medium of claim 15, wherein the probability is determined to be high when the first total number of first type of class dependencies is greater than the second total number of second type of class dependencies, wherein the first type of class dependencies comprise imported class (IC) dependencies and the second type of class dependencies comprise reflection loaded class (RLC) dependencies.

20. The non-transitory machine-readable storage medium of claim 15, wherein the probability is determined to be low when the first total number of first type of class dependencies is less than the second total number of second type of class dependencies, wherein the first type of class dependencies comprise imported class (IC) dependencies and the second type of class dependencies comprise reflection loaded class (RLC) dependencies.

* * * * *